Aug. 12, 1969  L. E. AUSTIN  3,460,459
CONTROL FOR AN INSTANTANEOUS FLUID HEATING DEVICE
Filed Aug. 28, 1967  2 Sheets-Sheet 1
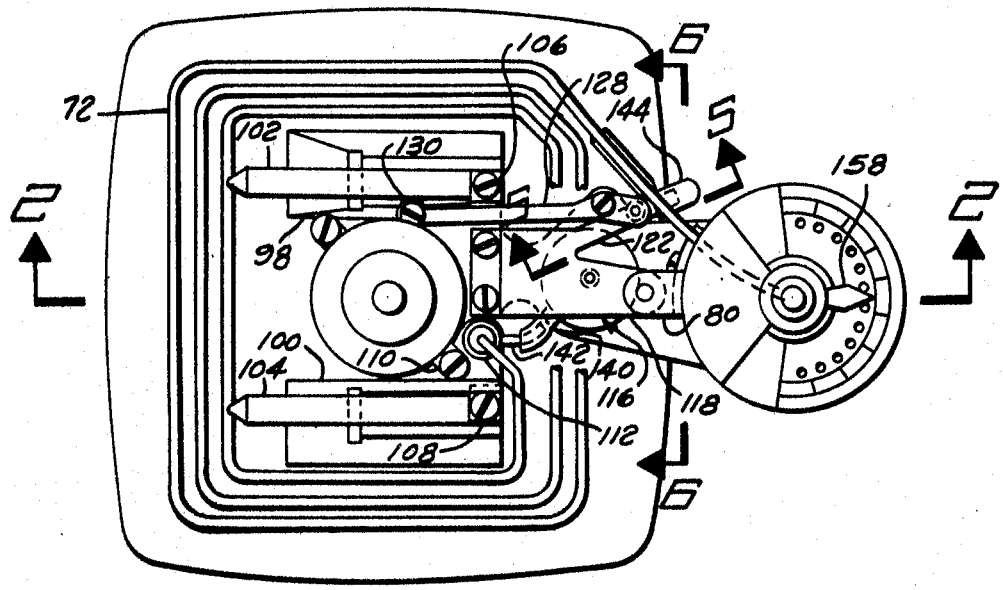
Fig. 1.
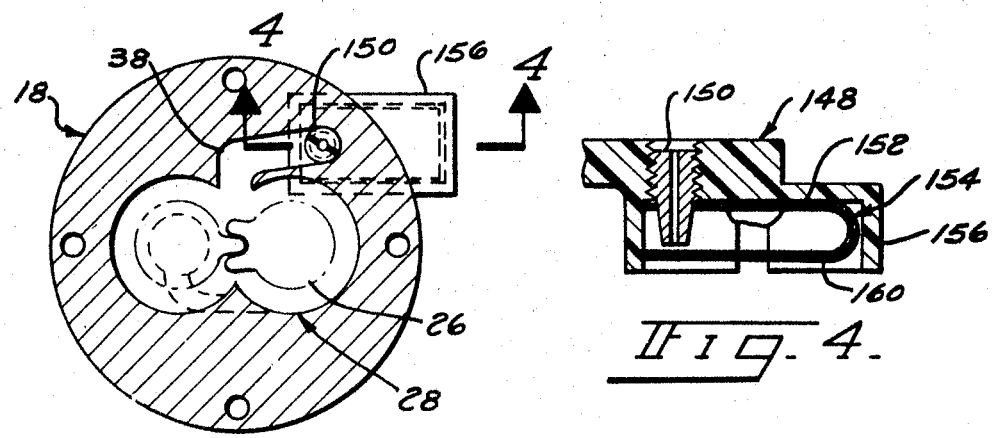
Fig. 3.
Fig. 4.
INVENTOR.
LEONARD E. AUSTIN
BY
William P. Hickey
ATTORNEY

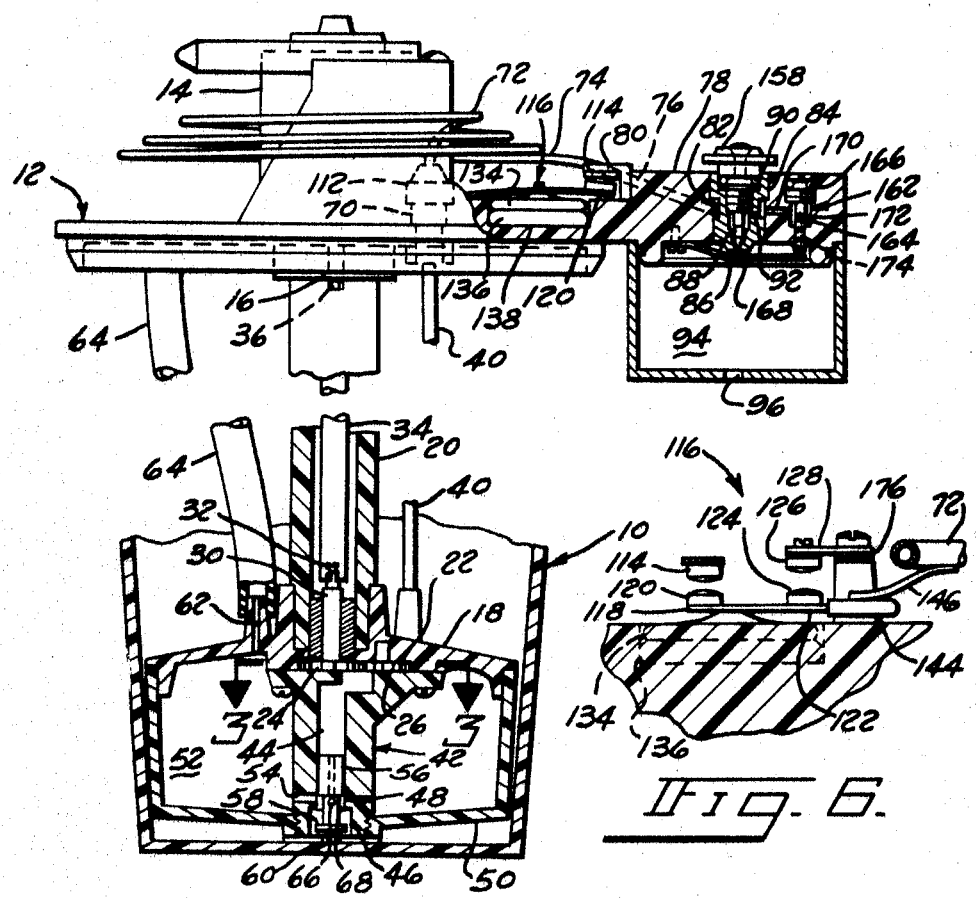
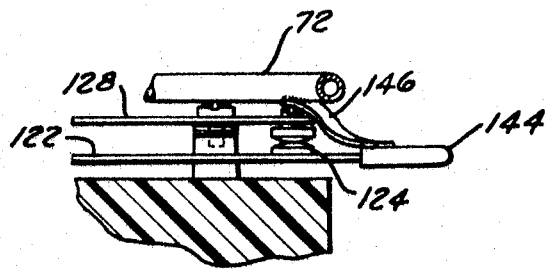

United States Patent Office 3,460,459
Patented Aug. 12, 1969

3,460,459
CONTROL FOR AN INSTANTANEOUS FLUID HEATING DEVICE
Leonard Edmond Austin, 646 Delano Ave., Prescott, Ariz. 86301
Filed Aug. 28, 1967, Ser. No. 663,747
Int. Cl. A23f 1/08
U.S. Cl. 99—282                      12 Claims

ABSTRACT OF THE DISCLOSURE

Fluid metering controls including a multifunctional pressure switch particularly adapted to control the operation of a pump and heating element; and apparatus for heating a predetermined quantity of fluid to a predetermined temperature regardless of inlet temperature during one pass through a heating element.

BACKGROUND OF THE INVENTION

The invention relates to systems, as for example hot beverage dispensers of the type shown in my Patent 3,269,599, wherein predetermined quantities of a liquid are heated to a predetermined temperature substantially instantaneously in a single pass through a heating device. In such a system, it is necessary that the delivery temperature be constant regardless of the starting temperature of the liquid. In systems of the type with which we are concerned, temperature control must be accomplished with a minimum of apparatus, and in a simple and inexpensive manner. Safety devices are also necessary to prevent damage to the heating element.

SUMMARY OF THE INVENTION

The present invention relates among other things to a compact inexpensive multifunctional pressure switch particularly adaptable to the control of apparatus for instantaneously heating a predetermined quantity of a liquid to a predetermined temperature; and also to the overall system which will heat a predetermined quantity of a liquid to a predetermined temperature during one pass through a heating element regardless of the starting temperature of the liquid.

An object of the invention is the provision of a new and improved system and/or controls therefor for delivering a predetermined quantity of liquid at a substantially predetermined temperature regardless of the starting temperature of the liquid.

A still further object of the invention is the provision of a new and improved switch which causes steam to be produced following a metered discharge to dry the system, and which inexpensively provides overtemperature control.

Further objects and advantages of the invention will become apparent to those skilled in the art to which the invention relates from the following description of the preferred embodiments described with reference to the accompanying drawing forming a part of this specification.

BRIEF DESCRIPTION OF THE DRAWINGS

FIG. 1 is a plan view of a hot liquid dispenser embodying principles of the present invention;

FIG. 2 is a sectional view taken approximately on the line 2—2 of FIG. 1;

FIG. 3 is an enlarged sectional view taken approximately on the line 3—3 of FIG. 2;

FIG. 4 is a fragmentary enlarged sectional view taken approximately on the line 4—4 of FIG. 3;

FIG. 5 is a fragmentary enlarged view taken approximately on the line 5—5 of FIG. 1; and FIG. 6 is a fragmentary enlarged view taken approximately on the line 6—6 of FIG. 1.

DESCRIPTION OF THE PREFERRED EMBODIMENT

While the invention may be otherwise embodied, it is herein shown and described as embodied in a hot liquid dispenser for use in automotive vehicles and the like. While the embodiment shown will provide hot water for making any hot beverage, it further includes structure for brewing hot coffee from coffee grounds.

The embodiment shown generally comprises a plastic open topped container 10 of generally square cross section, and a cover structure 12 therefor to which is attached all of the remaining structure. An electric motor 14 is secured to the top of the cover 12 with the shaft 16 of the motor projecting through the cover. A pump housing 18 is supported adjacent the bottom of the container 10 by a tubular mount 20 which surrounds the shaft 16 and is fastened to the bottom of the cover 12. The pump housing 18 contains a suitable pump cavity or recess 22 in which are located the driving gear 24 and driven gear 26 of a positive displacement gear pump 28. The driving gear 24 is fixed to a shaft 30 that is suitably journaled in the bottom end of the tubular mount 20 and the upper end of which contains a cross pin 32 that is received in a transverse slot in the bottom end of a shaft extension 34 housed within the tubular mount 20. The upper end of the shaft extension is connected to the motor shaft 16 by a similar cross pin and slot arrangement 36. The driving gear 24 meshes with the driven gear 26 and causes water trapped between their teeth to move around the periphery and be discharged into a pump discharge passage 38 in the housing 18 (see FIG. 3) and thence to a discharge tube 40 which extends upwardly through the cover member 12.

The pump cavity 22 which houses the gears 24 and 26 is closed off by a valve body 42 that is secured to the bottom of the pump housing 18 by suitable fasteners. The valve body 42 contains an axially extending inlet passage 44 which extends downwardly to the bottom end of the block, and the lower end of which is enlarged as at 46 to provide a valve seat 48. A measuring cup 50 is threaded onto the bottom end of the valve body 42 with the upper end of the cup being suitably sealed to the pump housing 18. The volume inside the measuring cup 50 forms a measuring chamber 52 of one cup capacity. The inlet passage 44 communicates at its bottom end with the container 10 and is communicated with the measuring chamber 52 by lateral passages 54 located immediately above the valve seat 48.

Control of water flow past the valve seat 48 and through passages 54 is controlled by a spool valve 56 having a headed end 58 thereon adapted to seat against and close off the valve seat 48. The weight of the spool valve 56 will normally hold the spool valve in the lower, open position shown in FIG. 2, where it is retained by a foraminous section of the measuring cup 50. This permits water from the container 10 to pass through suitable openings 60 in the foraminous section of the measuring cup 50, past the valve seat 48 to the lower end of the passage 44, and thence through the lateral passages 54 to the measuring chamber 52. This permits the measuring chamber to be filled with water from the container 10. The measuring chamber 52 is vented by means of an opening 62 in the valve housing 18 which is connected by a tube 64 to a vent opening in the cover 12. The spool valve 56 has an L-shaped passage 66 in its upper end which communicates the upper end of the spool valve with its reduced diameter portion 68 immediate above its headed end 58. The L-shaped passage, therefore, allows the pump to be primed by water from the container 10 at the same time that the spool valve 56 causes the measuring chamber 52 to be filled.

When the pump comprising gears 22 and 24 is started, it reduces the pressure in the upper end of the inlet passage 34 to thereby cause a differential pressure on the spool valve 56 which moves the spool valve 56 upwardly and seats the headed end 58 on the valve seat 48. This closes off further communication between the measuring chamber 52 and the container 10. The L-shaped passage 66 through the spool valve 56 provides sufficient pressure drop to hold the valve in its upper position until the pump has drained the measuring chamber 52. The discharge from the pump is, of course, sent through the discharge tube 40 to a discharge fitting 70 in the cover member 12.

The discharge fitting 70 is connected to an electrically resistive stainless steel heating tube 72 that is coiled around and spaced from the electric motor 14. The other end 74 of the heating tube 72 is sealingly wedged into a lateral passage 76 located in a nozzle body 78 that is an integral part of the cover member 12 located laterally from the container 10. The other end 74 of the heating tube 72 is held in place by a bracket 80 silver soldered to the heating tube and secured to the nozzle body 78 by suitable fasteners. The lateral passage 76 communicates with a vertical passage 82, the upper end of which is enlarged to receive a tubular valve body 84. The tubular valve 84 has a valve seat 86 in its lower end, and has a needle valve 88 therein for throttling flow with respect to the seat 86. The needle valve 88 threadably engages the upper end of the valve body 84 and is provided with an O-ring 90 which effects a seal therewith. The valve body 84 contains a passage 92 which communicates flow from the lateral pastage 76 to the inside of the tubular valve body 84. Flow from the valve body passes through the vertical passage 82 to the inside of a brewing chamber 94 adapted to contain a bag of ground coffee, not shown. The hot liquid from the brewing chamber 94 passes out of an orifice 96 in the bottom thereof to a cup, not shown, suitably supported beneath the brewing chamber 94.

The beverage dispenser shown in the drawings is adapted for use in an automative vehicle, and uses electrical energy from the vehicles twelve volt electrical system for heating the liquid. The cover member 12 is provided with a pair of plastic pedestals, the individual members 98 and 100 being positioned on opposite sides of the electric motor 14. A pair of parallel electrically conductive electrodes 102 and 104 are positioned on top of pedestals 98 and 100 respectively, and are adapted to be inserted in a female electrical support socket, not shown, which supports and carries electrical energy to the electrodes 102 and 104. The ends of the electrodes 102 and 104, which are located over the pedestals, are milled to provide upper flat surfaces which respectively receive one leg of respective Z-shaped straps 106 and 108. The vertical legs of the Z-shaped straps 106 and 108 lay against the inner side surfaces of the pedestals 98 and 100 respectively with the other horizontal legs of the straps extending toward each other, for making electrical connections as will now be described. The electrode 104 provides the ground connection, and the lower lateral leg of the strap 108 is positioned beneath the grounding lug 110 of the electrical motor 14, and is secured thereto by means of a suitable fastener. The end of the tubular heating element 72 which receives water from the pump is provided with a flange 112 which is clamped beneath the lower leg of the strap 108 to ground the tubular heating tube 72 thereto. As previously indicated, the opposite end of the tubular heating tube 72 is silver soldered to the bracket 80 and the bracket 80 is provided with an electrical heating contact 114.

The control of the heating tube 72 and the electrical motor 14 is obtained by means of an improved pressure actuatable normally open switch 116 which will now be described in detail. The switch 116 generally comprises an electrically conductive flexible switch blade, one end of which is positioned beneath the horizontal leg of the Z-shaped strap 106 and is held in secure electrical contact therewith by means of suitable fasteners. The other end of the flexible switch blade is bifurcated to provide one switch blade leg 118 that is positioned beneath the heating contact 114 and in turn is provided with a silver contact 120 for engagement with the contact 114. The other leg 122 of the bifurcated switch blade carries a contact 124 which is positioned below a motor contact 126. Motor contact 126 is adjustably threaded to one end of a contact strap 128 suitably secured to the cover 12 with its other end fastened to the electrical terminal 130 of the motor 14. The contacts 124 and 126 are also out of engagement in the normal unflexed condition of the switch blade.

The switch blade is adapted to be flexed upwardly by means of a pressure responsive movable wall 134 to a position wherein the contact on leg 118 engages the electrical contact 114 and wherein the contact 124 on leg 122 engages the motor contact 126. As can best be seen in FIG. 2, the movable wall 134 of the present embodiment is actuated by means of a plastic bladder 136 which is located in the bottom of a recess 138 in the cover 12 beneath the movable wall 134. The bladder 136 contains a tubular inlet connection 140 which sealingly receives a lateral tube 142 that is T connected to the inlet end of the heating tube 72. When the pump is discharging fluid under pressure, therefore, the bladder is expanded to flex the switch blade upwardly until contact 120 on leg 118 engages the contact 114, and the motor contact 124 is held against the motor contact 126. Pressure from the pump, therefore, will normally both energize the heating element and will hold the motor energized.

The motor contact switch blade leg 122 is more flexible than is the heater contact switch blade leg 118, and the motor contact 126 is positioned at a higher level than is the heater contact 114. The heater contact switch blade leg 118 is sufficiently flexible, however, to bend sufficiently after its contact 120 engages heater contact 114 to position contact 124 on the motor leg 122 against motor contact 126. During this flexture, the contact 120 is rubbed across heater contact 114 to provide a wiping, cleaning action. A plastic handle 144 is provided on the end of the leg 124 to permit manual initiation or termination of the pumping cycle. The motor 14 can be deenergized by manually pressing the handle 144 downwardly. When the pump stops running, the movable wall will be forced downwardly by the switch blade to open the motor switch first and deenergize the heating element soon afterward. When it is desired to start the pump, the handle 144 can be moved upwardly to cause its contact 124 to engage the motor contact 126. After the motor is started, pressure from the pump will move the movable wall 134 upwardly to bring its contact 120 into engagement with the heater contact 144 of the bracket 80.

The heating tube 72 is required to draw approximately 30 amps at 12 volts in order to heat a cup of water in approximately one minute. If the heating tube 72 does not contain a flow of water while it is energized, the heating element will become red hot and may become damaged. Normally, considerable expense is required to provide safety protection, but in the switch structure of the present invention, this function is inexpensively accomplished. The heating tube 72 is caused to pass adjacent the motor contact switch blade 122 on its way to the contact bracket 80, and one end of a bimetallic element 146 is silver soldered to the heating tube 72 with the other end of the bimetallic element 146 being positioned on top of the insulated handle 144. The bimetallic element 146 is arranged to force the handle 144 downwardly upon a rise in temperature and is proportioned to provide sufficient force to separate the contacts 124 and 126 at a temperature of approximately 200° F. If the flow of water through the heating tube 72 is stopped and steam is started to be produced, the bimetallic element 146 will move the handle 144 downwardly to stop the motor which in turn depressurizes the movable wall 134 to cause the heater contact switch blade leg 118 to separate from heater contact 114 and thereby deenergize the heating element.

While the invention so far described will have utility when heating water of a generally constant inlet temperature, it is highly desirable that devices used in automotive vehicles be capable of delivering water at a constant discharge temperature regardless of ambient conditions. The embodiment shown in the drawing provides water at a constant discharge temperature regardless of the starting temperature of the water supply by means of a valve arrangement shown in FIGS. 3 and 4. The temperature control valve 148 shown in FIGS. 3 and 4 comprises an adjustable nozzle 150, the upper end of which is positioned beneath the upper surface of the valve body 42 directly below and communicating with the pump discharge passage 38. The adjustable nozzle 150 is threaded into an extension of the valve body 42 and discharges directly into the measuring chamber 52. The adjustable nozzle 150 projects through an opening in the top leg 152 of a U-shaped thermostatic element 154 the sides of which are confined within rectangular abutments 156 on the bottom of the pump housing. Plastic deformed over the side edges of the leg 152 holds the thermostatic element 154 in place. The apparatus will provide a constant discharge temperature at the orifice 86 within 1° F. even though the temperature of the water in the measuring chamber 52 may vary from 33° F. to 120° F. Adjustment of the desired temperature of the water discharged from the orifice 86 can be varied by rotating the handle or pointer 158 that is fastened to the needle valve 88. By rotating the pointer 158 clockwise to decrease the clearance between needle valve 88 and seat 86, the temperature of the discharge may be increased, and by turning the pointer 158 counterclockwise, the temperature of the discharge water can be reduced. The valve 88 operated by handle 158, therefore, is the primary temperature control and once adjusted, the voltage output of a particular vehicle electrical system will provide a predetermined output water temperature.

The operation of the structure so far described will now be given assuming that the electrodes 102 and 104 are plugged into an electrical socket mounted in an automobile, and that the container 10 and measuring chamber 52 have water therein. A cup containing powdered beverage making material is positioned beneath the orifice 96. Thereafter, the handle 144 is moved upwardly to flex the leg 122 and bring the contact 124 into engagement with the motor contact 126 to start the electrical motor 14. This completes an electrical circuit from electrode 102 through Z bracket 106, switch blade leg 122, contacts 124 and 126, strap 128, motor terminal 130, motor 14, ground leg 110, strap 108, and ground electrode 104. Motor shaft 16, therefore, rotates gear 24, which meshes with gear 26 to cause water to flow around their periphery from pump inlet 144 to the pump discharge passage 38. A partial vacuum is thereby produced in the inlet 44 which causes differential pressure across the spool valve 56 to bring its head 58 into engagement with the valve seat 48 to close off further communication between the measuring chamber 52 and the container 10. Thereafter, water is sucked through the passages 54 in the valve body 42 to the gears 24 and 26 which discharge the water through the discharge passage 38 to the discharge tube 40. A certain amount of water flowing through the pump discharge passage 38 to bled back into the measuring chamber 52 by the nozzle 150 depending upon the temperature of the water. The water which proceeds to the heating tube 72 produces a back pressure in the bladder 136. Pressure in the bladder 136 forces the movable wall 134 upwardly to move leg 118 into engagement with heater contact 114 to thereupon establish a heating circuit from electrode 102, Z bracket 106, flexible blade 118, contacts 120 and 114, bracket 80, heating tube 72, Z-shaped strap 108 to grounding electrode 104. Pressure now also holds contact 124 against motor contact 126 to keep the motor 14 energized. Water flow through the tube 72 is thereafter heated as it flows through the tube following which it is discharged to the vertical passage out of the valve body 84 to flow through the chamber 94 to the cup.

The temperature of the water passing through the valve body will normally be approximately 180° F., but can be changed by suitably adjusting the handle 158, as previously explained, to vary the back pressure on the nozzle 150. With the handle 158 in any given position, a constant water discharge temperature is achieved by reason of the temperature control valve 148. As previously explained, a certain amount of water is normally recirculated through the adjustable nozzle 150 back to the measuring chamber 52, and the amount of this recirculation is controlled by the distance between the lower leg 160 of the bimetallic element 154 and the bottom end of the adjustable nozzle 150. The bimetallic element 154 is arranged so that the leg 160 moves away from the nozzle as the temperature of the discharged water decreases, and moves towards the end of the nozzle 150 as the temperature of the water increases. It will, therefore, be seen that when the water in the measuring chamber 52 is cold, a greater amount of the water will be recirculated back to the pump, thereby decreasing the rate of flow through the heating tube 72. When the temperature of the water is hot, the amount of recirculation is greatly reduced and at some upper limit, the lower leg 160 will engage the nozzle 150 to substantially cut off recirculation to the measuring chamber 52. Under this condition all of the pump discharge is fed to the heating tube 72, and this increased flow of water is heated to a correspondingly reduced temperature so that the water discharge from the element remains substantially constant.

When a cup of hot beverage has been produced, the liquid level in the measuring chamber 52 drops below the lateral passage 54, and air enters the pump inlet to cause the pumping action to cease. The drop in pressure so produced is communicated to the bladder 136, and the spring action of the switch blade moves leg 122 away from the motor contact 126. Approximately ½ second thereafter, contact 120 moves out of engagement with heater contact 114 to deenergize the heating tube 72. It will be seen that the unit so far described is capable of heating water for preparing any hot beverage capable of being made from a powder mix including tea, hot chocolate, soup, etc.

If for some reason flow of water through the heating tube 72 should stop while the pump is still running, the temperature of the heating tube 72 will increase, and at a temperature of approximately 200° F., the bimetallic element 146 will flex downwardly against the handle 144 to move the contact 124 out of engagement with the motor contact 126 to thereby deenergize the motor 14. When the motor 14 is deenergized, the drop in pressure is communicated to the bladder 136 which collapses and allows the switch blade to move the leg 118 away from the heater contact 114 and thereby deenergize the heating tube 72.

It is highly desirable that the flexure of the blade be limited or controlled after the contacts on its legs engage the contacts 114 and 126. This may be accomplished by a suitable abutment means supported by the cover member 12 over the top of the blade. In the preferred embodiments shown in the drawings, however, the contact 114 serves as an abutment which limits the movement of the movable wall 134. A sufficient length of the blade exists between the portion abutted by the movable wall 134 and the contact 124 so that the leg 118 can be easily flexed away from the contact 126 when the movable wall 134 holds the blade in abutment with the contact 114.

The embodiment of the hot beverage maker shown in the drawing is also capable of brewing hot coffee from coffee grounds. A bag containing coffee grounds is placed in the brewing chamber 94 so that the hot water discharging from the passage 86 passes through the coffee grounds on its way to the exit orifice 96. As brewing progresses, the coffee grounds become compacted to produce a back pressure which appreciably reduces the flow of hot water. As previously indicated, the valve 88 controlled by the handle 158 produces a back pressure against the pump which in turn both slows the motor and produces a side recirculating flow through the nozzle 150. In the embodiment shown in the drawing, a compensating valve 162 is provided for decreasing the pressure drop created by the valve 88 as the pressure drop through the coffee grounds increases. This is accomplished by a nozzle 164 which is located in the nozzle body 78 to one side of the primary temperature control valve 84. The nozzle 164 is threaded into the nozzle body 78, and contains an O ring 166 for effecting a seal therewith. The bottom end of the nozzle projects into the chamber 94 and is abutted by one end of a bimetallic thermostatic element 168 which is arranged to deflect away from the end of the nozzle 164 upon an increase in temperature. The other end of the bimetallic element is suitably affixed to the nozzle body 78 on the opposite side of the vertical passage 82, so that water discharged from the valve body 84 impinges upon the thermostatic element 168. Water from the passage 76 is communicated to the center of the nozzle 164 by a lateral passage 170 in the nozzle body, and an aligned opening 172 in the nozzle 164 which leads to the outlet passage 174 of the nozzle.

Compacting of the coffee grounds increases the back pressure upon the water discharging from the heating tube 72 to result in a slight decrease in flow. This decrease in flow causes the temperature of the water to increase slightly, and this slight increase in temperature causes a deflection of the bimetallic element 168 away from the nozzle 164 to open the nozzle and thereby decrease back pressure upon the heating tube 72. This allows an increase in flow. It will be seen that the compensating valve 162 reduces the pressure drop across the valve 88 as the pressure drops of the coffee grounds increases so that the sum of these pressure drops generally remains approximately constant resulting in a generally constant rate of water discharge and therefore a generally constant exit water temperature.

The most preferred arrangement of the pessure actuatable switch 116 is shown clearly in FIG. 6. In the preferred arrangement, the motor contact 126 is spaced a greater distance from the open position of the switch blade contact 124 than the heater contact 114 is spaced from its cooperating switch blade contact 120. It has been found that the pressure dissipation in the bladder 106 which occurs after the pump has removed all water from the measuring chamber 52, allows a gradual movement of the switch blade toward the normally open position shown in FIG. 6. During the initial stage of this movement, switch blade contact 124 moves out of engagement with the motor contact 126 to stop the motor, while allowing the switch blade contact 120 to remain in engagement with the heater contact 114 for a short interval. During this short interval, the water which remains in the heating tube 72 is converted to steam which issues from the orifices 86 and 174 to remove water from and dry out the coffee grounds within the measuring chamber 94. The coffee grounds will usually be retained within a bag, or equivalent, and the steam flow through the bag purges any remaining water therefrom. The bag of coffee grounds can then be removed without dripping. This generation of steam only occurs during the time that the switch blade is straightening from its bowed condition and while moving away from the motor contact 126. During the final straightening movement of the blade, its contact 120 moves out of engagement with the heater contact 114 to prevent further energizing of the heater tube 72 and production of steam. The amount of steam which is produced can be increased by increasing the spacing of the motor contact 126 from the open position of the switch, and this distance can be adjusted by rotation of the screw supporting contact 126 and/or by inserting shims 176 beneath the motor strap 128 and the cover support structure.

While the invention has been described in considerable detail, I do not wish to be limited to the particular embodiments shown and described, and it is my intention to cover hereby all novel adaptations, modifications, and arrangements thereof which come within the practice of those skilled in the art to which the invention relates and are covered by the following claims.

I claim:

1. In a hot beverage dispenser and the like for delivering a predetermined quantity of liquid at a predetermined temperature: a pump having an inlet and an outlet, measuring means for delivering a predetermined quantity of liquid of variable temperature to said inlet, an orifice communicating pump discharge back to said means, and a thermostatic element covering the discharge of said orifice, said thermostatic element moving away from said orifice upon a drop in temperature of the liquid.

2. The device of claim 1 wherein said thermostatic element is U-shaped, and said orifice is in a tubular nozzle threadably mounted to project through an opening in one leg of the U-shaped element toward the other leg, and whereby rotation of the nozzle precisely changes the distance between the end of said nozzle and the other leg of the U-shaped element.

3. The device of claim 1 wherein said measuring means is a chamber of predetermined volume, said U-shaped thermostatic element is positioned in said chamber, and flow is regulated by the distance between the end of said nozzle and the other leg of said U-shaped element.

4. In a hot beverage dispenser and the like which delivers a predetermined quantity of liquid at a predetermined temperature to an outlet: a measuring chamber of predetermined volume, a heating element, a pump taking suction on said chamber, conduit means for delivering fluid from said pump to said heating element and then to said outlet, a variable orifice in said conduit means between said heating element and said outlet, a bypass orifice communicating said conduit means to said measuring chamber, and a thermostatic element throttling discharge from said bypass orifice and arranged to increasingly throttle flow out of said orifice as the temperature increases.

5. The device of claim 4 wherein said bypass orifice communicates flow upstream of said heating element to said chamber, and said thermostatic element is located in and continually adjusts to the temperature of liquid in said measuring chamber.

6. The device of claim 4 including a reservoir for holding liquid for filling said measuring chamber, and a valve for controlling communication between said reservoir, measuring chamber and pump, said valve having a normal position to which it is biased and in which it communicates said reservoir to said pump and measuring chamber, and having an actuated position to which it is moved by differential pressure created by said pump and in which it closes off communication between said reservoir and measuring chamber while communicating said measuring chamber to said pump.

7. The device of claim 4 wherein said variable orifice is a manually controlled valve, and wherein a thermostatically controlled bypass valve is provided around said manually controlled valve, said thermostatically controlled valve being arranged to open upon an increase in temperature of the water issuing from said manually controlled valve.

8. In a hot beverage dispenser and the like: a coffee brewing chamber: a nozzle discharging into said brewing chamber, a tubular heating element discharging into said nozzle, a pump having an inlet and an outlet, said outlet discharging into said tubular heating element, measuring means for delivering a predetermined quantiy of liquid whose temperatures may vary to said inlet, a throttle valve throttling flow from said heating element to said nozzle, a bypass orifice around said throttle valve and discharging into said brewing chamber, and a thermostatic element in said brewing chamber and throttling discharge of said bypass orifice, said thermostatic element reducing said discharge as the temperature of the discharge decreases.

9. The beverage dispenser of claim 8 in which said bypass orifice discharge into said brewing chamber separately from said nozzle and said thermostatic element is cantilevered from one side of said nozzle across the discharge of said nozzle to beneath said discharge of said bypass orifice.

10. A pressure switch comprising: a flexible bifurcated spring blade fixed at one end and having first and second legs at its other end extending generally away from said fixed end, said blade having a normal position, first and second electrical contacts positioned to one side of said normal position of said blade for engagement by said first and second legs respectively, a pressure responsive movable wall for moving said blade from said normal position to engagement with said contacts, said movable wall applying actuating force to an area of said blade sufficiently remote from the contact of one of said legs to permit it to be sprung from its contact without moving the other leg from its contact, and means for conducting pressure to said movable wall to bias said legs against said contacts.

11. Apparatus including the pressure switch of claim 10 wherein said one of said legs is said first leg, and further including: means for producing heat when said second leg engages said second contact, and a bimetallic element heated by said last mentioned means, said bimetallic element biasing one of said legs away from its contact when said bimetallic element is heated above a predetermined temperature.

12. The pressure switch of claim 11 wherein said bimetallic element actuates said first leg.

References Cited

UNITED STATES PATENTS 2,839,988  6/1958  Tritt _____ 99—282
3,269,599  8/1966  Austin _____ 222—63

ROBERT W. JENKINS, Primary Examiner

U.S. Cl. X.R.

99—305; 200—81; 222—63; 337—3